United States Patent
Baudesson et al.

(10) Patent No.: US 7,760,527 B2
(45) Date of Patent: Jul. 20, 2010

(54) DEVICE AND METHOD FOR CONTROLLING AN ELECTRIC POWER CONVERTER

(75) Inventors: Philippe Baudesson, La Boissiere (FR); Arnaud Videt, Lille (FR); Philippe LeMoigne, Nomain (FR); Nadir Idir, Tressin (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 287 days.

(21) Appl. No.: 11/797,157

(22) Filed: May 1, 2007

(65) Prior Publication Data
US 2007/0263422 A1    Nov. 15, 2007

(30) Foreign Application Priority Data
May 9, 2006    (FR)    .................................. 06 04090

(51) Int. Cl.
*H02M 5/42*    (2006.01)
*H02M 7/68*    (2006.01)
*H02M 3/24*    (2006.01)
*H02M 7/44*    (2006.01)

(52) U.S. Cl. .......................... 363/98; 363/132; 363/170

(58) Field of Classification Search .................. 363/43, 363/98, 132, 170; 318/768, 812
See application file for complete search history.

(56) References Cited

U.S. PATENT DOCUMENTS 6,101,109 A * 8/2000 Duba et al. ................... 363/71

6,842,354 B1    1/2005    Tallam et al. .................. 363/98
2006/0077701 A1 *    4/2006    Baudesson et al. .......... 363/132

OTHER PUBLICATIONS

Tallam, R.M. et al, "A carrier-based PWM scheme for neutral-point voltage balancing in three-level inverters," Applied Power Electronics Conference and Exposition, 2004, APEC '04, Nineteenth Annual IEEE, Anaheim, Ca., USA, Feb. 22-26, 2004, Piscataway, NJ, USA, IEEE, Feb. 22, 2004, pp. 1675-1681.

Bendre, A. et al, "Comparative evaluation of modulation algorithms for neutral point clamped converters," Industry Applications Conference, 2004, 39th IAS Annual Meeting, Conference Record of the 2004 IEEE, Seattle, WA, USA, Oct. 3-7, 2004, Piscataway, NJ, USA, IEEE, Oct. 3, 2004, pp. 798-805.

(Continued)

*Primary Examiner*—Adolf Berhane
*Assistant Examiner*—Matthew Grubb
(74) *Attorney, Agent, or Firm*—Steptoe & Johnson LLP (57) ABSTRACT

The control device of an electric power converter comprises a control circuit controlling turn-on of power semi-conductor arms. The control circuit comprises a module for determining possible turn-offs of an arm, and a module for selecting turn-offs enabling double switching from among the possible turn-offs. Selection of turn-offs enabling an arm of said converter to be turned off according to the turn-offs enabling double switching in other arms. The electric converter comprises one such control device. The method comprises determination of turn-offs enabling double switching from among the possible turn-offs, and selection of turn-offs to turn an arm of said converter off according to the turn-offs enabling double switching.

17 Claims, 7 Drawing Sheets

OTHER PUBLICATIONS

Ratnayake, K.R.M.N. et al, "A novel PWM scheme to eliminate common-mode voltage in three-level voltage source inverter," Power Electronics Specialists Conference, 1998, PESC 98 Record, 29$^{th}$ Annual IEEE, Fukuoka, Japan, May 17-22, 1998, New York, NY, USA, IEEE, US, vol. 1, May 17, 1998, pp. 269-274.

Zhang, H. et al, "Multilevel Inverter Modulation Schemes to Eliminate Common-Mode Voltages," IEEE Transactions on Industry Applications, IEEE Service Center, Piscataway, NJ, US, vol. 36, No. 6, Nov. 2000.

* cited by examiner

DEVICE AND METHOD FOR CONTROLLING AN ELECTRIC POWER CONVERTER

BACKGROUND OF THE INVENTION

The invention relates to a control device of an electric power converter. The control device may include a control means for controlling turn-on or switching voltage in one or more power semi-conductor arms.

The electric power converter includes a DC power supply which includes a first positive voltage line, a second negative voltage line, and a third intermediate voltage line, and conversion means having at least three power semi-conductor arms connected between the positive, negative, and intermediate voltage lines, and outputs to supply at least one output voltage. The control means include a processing means to supply modulation signals of control signals of the arms.

The invention also relates to an electric converter comprising one such control device.

The invention also relates to a method for controlling one such converter.

STATE OF THE ART

Figure 1:
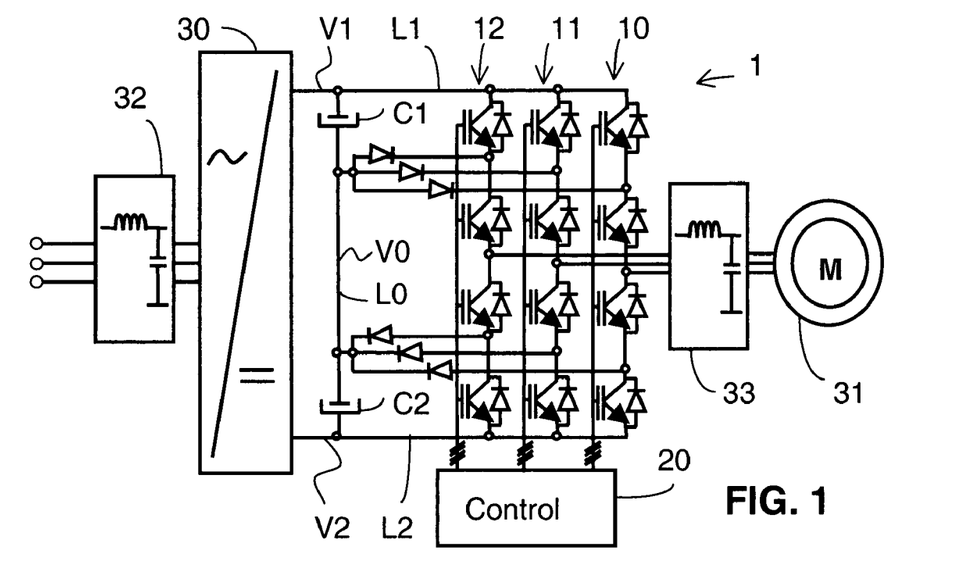
FIG. 1 represents a diagram of a converter in which the invention can be applied.

Known converter control devices control power semi-conductor switching arms to supply output voltages supplying power to a consumer load. When the converters are of the three-level type like the one represented in FIG. 1, arms of the converter are connected between a positive voltage V1 line L1, a negative voltage V2 line L2 and an intermediate voltage V0 line L0. The intermediate voltage line L0 is connected to a common point of two DC voltage filtering capacitors C1 and C2 connected in series between the line L1 and the line L2. In the diagram of FIG. 1, a first arm 10 includes four semi-conductors respectively connected between the positive voltage V1 line L1 and a first common point receiving the intermediate voltage V0 via a first diode, between the first common point and a first output S10, between the first output and a second common point receiving the intermediate voltage V0 via a second diode connected in reverse manner from the first diode between the second common point and the negative voltage V2 line L2. Two other arms 11 and 12 each include four power semi-conductors and two diodes connected in the same way to supply electric voltages or currents for consumer loads or electric power systems on outputs respectively S11 and S12. A control circuit 20 controls turn-on or turn-off of the semi-conductors of the arms.

Converters generally also include AC-DC rectifiers 30 receiving an AC voltage from an electric power supply system and supplying a DC voltage or current on the lines L1 and L2.

In particular, when converters are used in variable speed drives to supply an electric motor 31, the sharp voltage variations caused by the power semi-conductors being turned on and off give rise to common mode currents flowing on the power supply lines of the motor or more generally of the load. Such common mode currents often loop via the ground of the electrical installation between the input and output of the converter. In known manner, this type of current generates electromagnetic disturbances that have to be attenuated by electromagnetic filters 32 and 33 fitted upline and/or downline from the converter.

Figure 2:
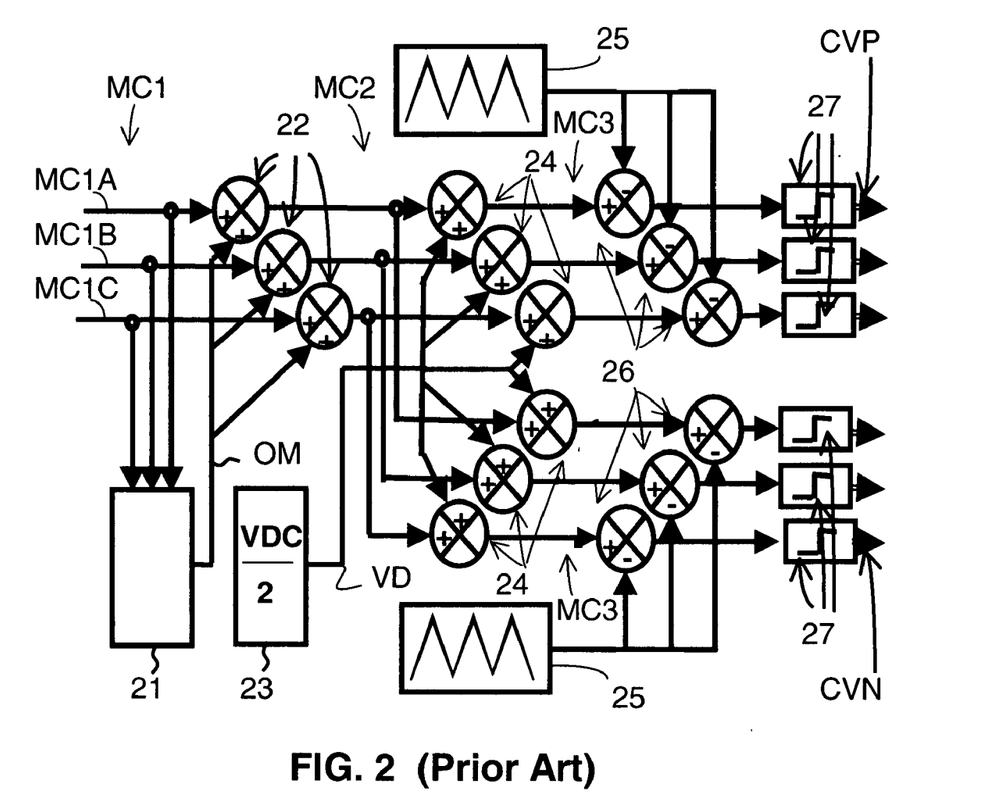
FIG. 2 represents a block diagram of a control circuit of a converter of known type.

FIG. 2 shows an example of a block diagram of a part of a processing unit 7 of a control circuit 20 to supply control signals of the arms. In this circuit, modulation signals are used for intersective modulation on a triangular high-frequency carrier signal enabling pulse width modulation to be performed. Thus, each converter phase or arm command is modulated by a modulation signal. When the converter is a three-level converter with intermediate voltage, the modulation channels can be doubled up.

In the diagram of FIG. 2, a module 21 determines a general control component OM to be applied to control modulation signals MC1 coming from a regulating unit of the converter. Preferably, the general control component OM includes over-modulation signals to successively turn an arm of the converter off. First operators 22 modify first three-phase modulation signals MC1 by applying said general control component OM thereto. Signals MC2 thus transformed also include the general control component OM. A module 23 provides a reference voltage VD which is applied to the signals MC2 by operators 24 to supply modulation signals MC3. One or two modules 25 supply a high-frequency signal designed to be modulated by modulation signals MC3 representative of the initial modulation signals modified by the operators 22 and 24. Operators 26 combine the modulation signals MC2 with triangular high-frequency signals F1 to supply control signals CVP and CVN of the arms 10, 11, 12. The control signals are in pulse width modulation format and operate on three voltage levels. As the arm commands are preferably binary on-off commands, conditioning circuits 27 shape the control signals. The reference signal VD is generally representative of a DC voltage, for example one half of the DC voltage of the lines L1 and L2 or of the intermediate voltage.

Voltage variations on three voltage levels with regulation according to a three-dimensional vector space operating by numerous voltage variations per regulation cycle cause very large common mode voltages and currents on output from the converter. The use of common mode filters leads to high manufacturing costs, bulky product dimensions and converter power and efficiency losses.

SUMMARY OF THE INVENTION

The object of the invention is to provide a device and a method for controlling a converter enabling common mode disturbances to be reduced, and to provide a converter comprising one such device.

In a device according to the invention, the control means include first means for determining possible turn-offs of an arm, and first means for selecting turn-offs where a selected turn off blocks switching of voltage in a selected arm of the converter, thereby enabling double switching of the other two arms. The term "turn offs" refers to blocking controls for blocking switching of voltage in the arms.

Preferably, the control means include second means for selecting turn-offs suitable for intermediate voltage balancing, where selection of turn-offs enables one arm of the converter to be turned off according to the intermediate voltage balancing.

In a preferred embodiment, the control means include means for supplying at least two carrier signals with opposite slopes, and means for modulating carrier signals by receiving said carrier signals with opposite slopes and modulation signals, and blocking over-modulation of an arm or output.

Preferably, the control means include means for selecting carrier signals to be applied to control of converter arms.

Preferably, the means for selecting carrier signals select the carrier signals according to a direction of rotation in an enlarged triangle pointed by a vector in a control vector space.

Advantageously, the means for selecting carrier signals select the carrier signals according to a priority switching of the same transistor-diode or diode-transistor type in two arms which switch at the same time.

Advantageously, the means for selecting carrier signals select the carrier signals according to a priority switching in the diode-transistor direction in two arms which switch at the same time.

Preferably, the carrier signals are sawtooth-shaped signals having a first portion with a very fast variation or stepped pattern and a second portion having a slope forming a ramp, where the complementary double switching direction is determined on the fast variation portions.

Advantageously, during a regulation cycle corresponding to a vector defined in a vector space, the output variation has at most two voltage levels.

Advantageously, during a regulation cycle corresponding to a vector defined in a vector space, the output variation has at most two voltage level variations.

An electric converter includes a control device including means for turning on the power semi-conductor arms, a DC power supply including a first positive voltage line, a second negative voltage line, and a third intermediate voltage line, and conversion means having at least three power semi-conductor arms connected between the positive, negative and intermediate voltage lines, and outputs to supply at least one output voltage. The control means include processing means to supply modulation signals of control signals of said arms. The processing means include at least one control device as defined above and means for measuring the currents arranged on output conductor lines and connected to the control device to supply signals representative of currents to means for determining blocking controls for blocking switching in one of the arms. The term "turn on" refers to the switching of voltage in the power semiconductor arms.

A method for controlling an electric power converter includes a control device including means for turning on the power semiconductor arms, a DC power supply including a first positive voltage line, a second negative voltage line, and a third intermediate voltage line, and conversion means having at least three power semi-conductor arms connected between said positive, negative or intermediate voltage lines and outputs to supply at least one output voltage, where the method includes determining possible turn offs for blocking switching of voltage in one of the arms, selecting turn offs from the determined possible turn offs for enabling double switching of the other two arms, and applying a selected turn off to a control signal (MC1).

Advantageously, the method includes a second selecting of blocking controls suitable for intermediate voltage balancing, by selecting the arm in which to block switching of voltage according to intermediate voltage balancing.

Preferably the method includes supplying at least two carrier signals with opposite slopes, and modulation of the carrier signals with opposite slopes by overmodulating a power arm or output turn-off.

In a preferred embodiment, the method includes selecting carrier signals for application to control signals.

Preferably, the method includes selecting carrier signals according to a direction of rotation in an enlarged triangle pointed by a vector of a control vector space.

Advantageously, the method includes selecting carrier signals according to a priority switching of the same transistor-diode or diode-transistor type in two arms which switch at the same time.

Preferably, the method includes supplying sawtooth-shaped carrier signals having a portion with a first very fast variation or stepped pattern and a second portion having a slope forming a ramp, where the complementary double switching direction is determined on the fast variation portions.

Advantageously, the method includes causing an output variation having at most two voltage levels or at most two voltage level variations, during a regulation cycle corresponding to a vector defined in a vector space.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF PREFERRED EMBODIMENTS

Figure 3:
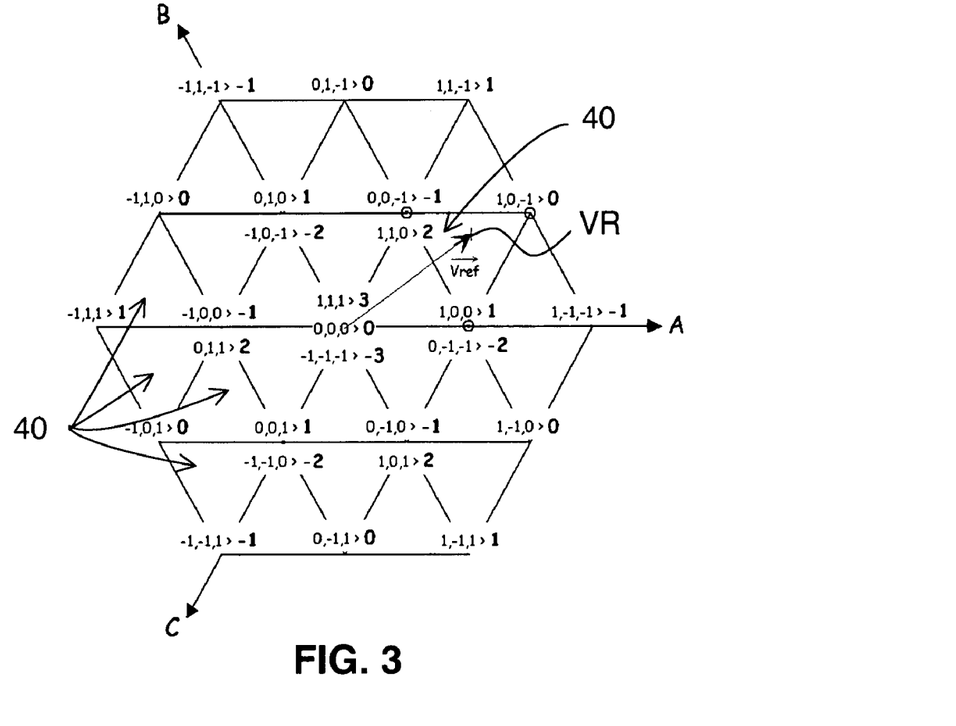
FIG. 3 represents a diagram of a vector space determining control of the arms of a three-arm converter.
Figure 4:
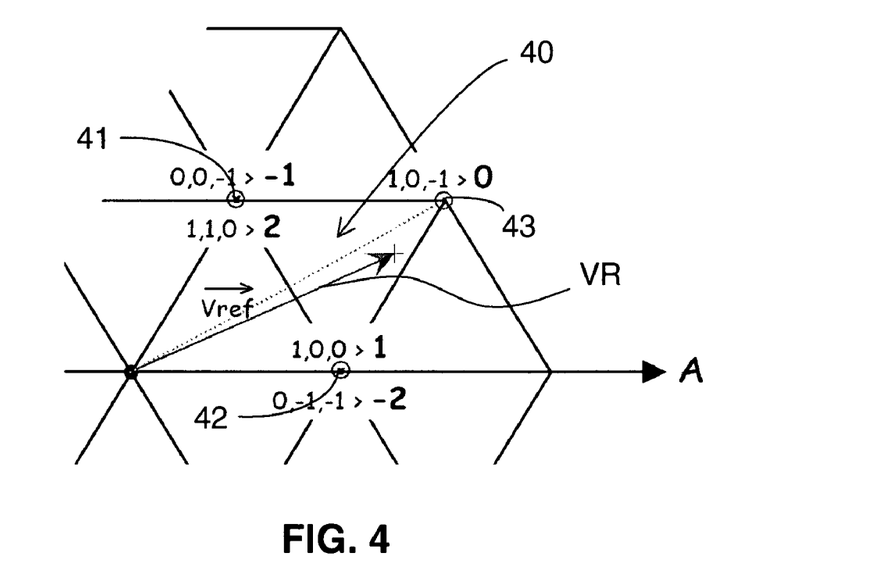
FIG. 4 represents a detail of a regulation triangle of a diagram of a vector space of FIG. 3.

In an electric power converter control device, the converter arms are controlled according to a regulation mode defined in a vector space. FIG. 3 represents a diagram of a vector space able to determine control of the arms of a three-arm converter referenced on axes A, B and C. In this case, a reference vector VR, which is the image of the control voltages to be applied to the three arms, points in a triangle 40 of the vector space. A detail of a regulation triangle 40 of a vector space diagram is represented in FIG. 4. Apexes 41, 42 and 43 of the triangle 40 correspond to states of the power semi-conductors or to voltage states of the converter outputs during a regulation cycle. The notation of the apexes corresponds to the individual states of each output and to a global state of the outputs corresponding to the common mode voltage in reduced unit generated by the converter. Thus, during a regulation cycle equivalent to a chopping period, the outputs of the converter arms successively take set values corresponding to a common mode output voltage defined in the apexes of the triangle of the vector space surrounding the vector.

With a state-of-the-art device, the number of voltage variations per cycle and the voltage deviation or amplitude per cycle can be very high resulting in large common mode voltages and currents. For example, in the triangle 40 represented in FIG. 4, the global state of the output corresponding to the common mode voltage in reduced unit can take the values −2, −1, 0, 1, 2 and generate a large number of variations and a strong amplitude.

In a control device according to one embodiment of the invention, the number of variations and/or the amplitude of the outputs is reduced to reduce the common mode disturbances.

Figure 5:
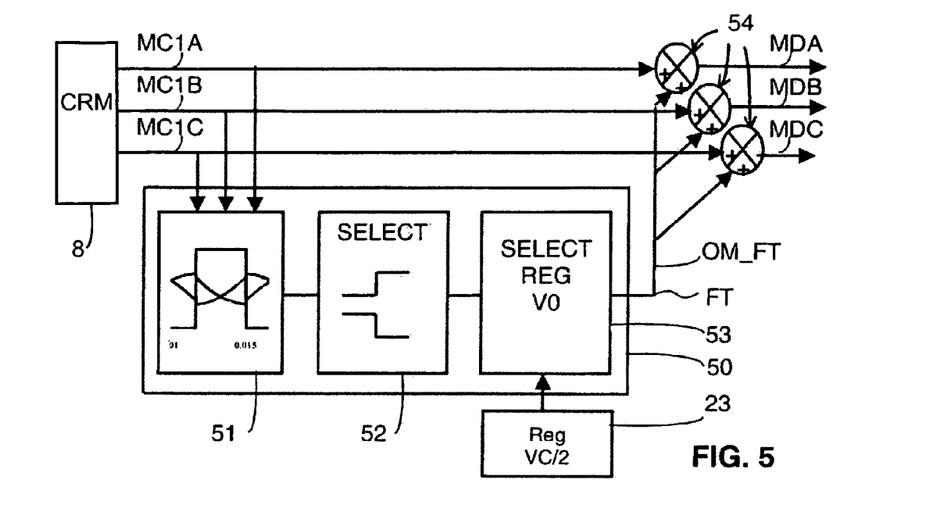
FIGS. 5 and 6 represent diagrams of a control device according to an embodiment of the invention.
Figure 6:
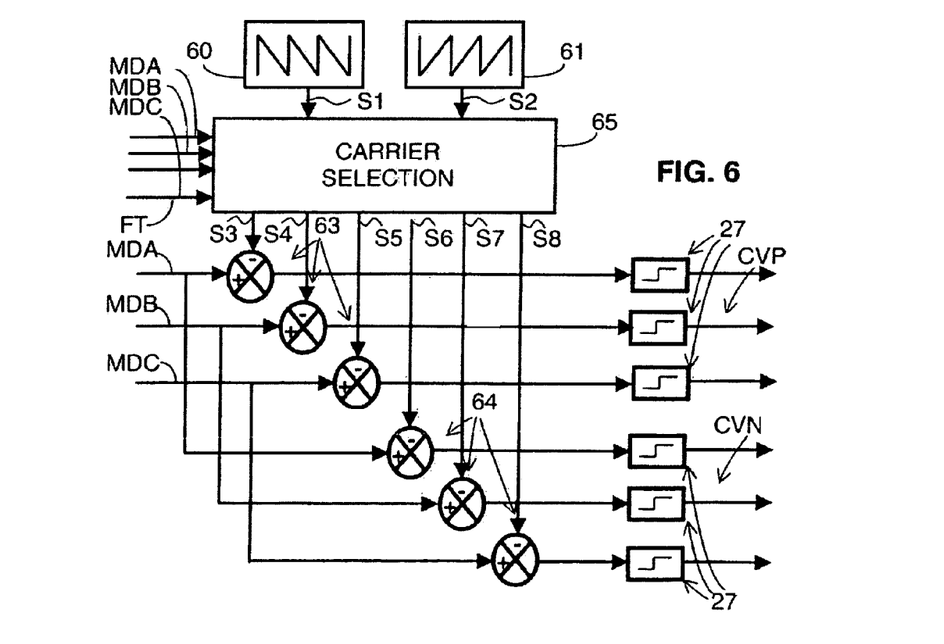

FIGS. 5 and 6 represent partial diagrams of a control device according to an embodiment of the invention. In FIG. 5, a regulation signal processing module 50 includes a first module 51 for determining possible turn-offs, or blocking control, for a reference vector VR1 that is the image in the vector space of the three control signals MC1A, MC1B, MC1C coming from the converter regulation module. Turn-off, or blocking control, is preferably performed by over-modulation signals to be applied to modulation of the three arms, but other turn-off, or blocking control, means can however be used. The turn-offs, or voltage switching, enable a semi-conductor arm to be turned off to have a positive, negative or intermediate voltage. A first turn-off, or blocking control, selection module 52 selects turn-offs enabling double switching from among the possible turn-offs. Turn-off selection enables an arm of the converter to be turned off according to the turn-offs enabling double switching in other arms. Thus, when one arm is off and the other two arms are switching, their switching direction is complementary as are the corresponding voltage variations. Selected complementarity of the voltage variations greatly reduces common mode voltages and currents.

Advantageously, when there are at least two turn-off possibilities enabling double switching, a second turn-off selection module 53 selects one or more turn-offs suitable for intermediate voltage balancing. Turn-off selection enables an arm of the converter to be turned off also according to intermediate voltage balancing. For example, over-modulation signals FT carrying turn-off information can be applied directly to the modulation signals or via a general control component OM. In FIG. 5, a general control component OM_FT also includes the over-modulation with turn-off signals applied to the modulation signals with operators 54. Over-modulation is preferably of the flat top type, i.e. by flat blocking of a modulation signal commanding turn-off of the arm. On output of the operators 54, modulation signals MDA, MDB and MDC include selected over-modulation signals to reduce the common mode voltages.

In FIG. 6, the control device includes modules 60 and 61 supplying carrier signals to supply at least two carrier signals with opposite slopes S1 and S2.

The signals S1 and S2 can be applied directly to carrier signal modulation operators 63 and 64 to be modulated by the modulation signals MDA, MDB and MDC including the power arm or output turn-off over-modulation signals.

Preferably, the control device includes a selection module 65 for selecting carrier signals to be applied to converter arm control. This module receives first carrier signals S1 and S2 with opposite slopes and distributes signals S3 to S8 corresponding to carrier signals with opposite slopes reconditioned according to the direction of slope of the signals, and the positive or negative voltages of the switching arms. Carrier signal selection also enables the switching dead times to be managed according to the switching direction, transistor-diode or diode-transistor. By having switching directions of identical types, reduction of the voltage variations and consequently of the common mode disturbances is even more efficient.

Figure 7:
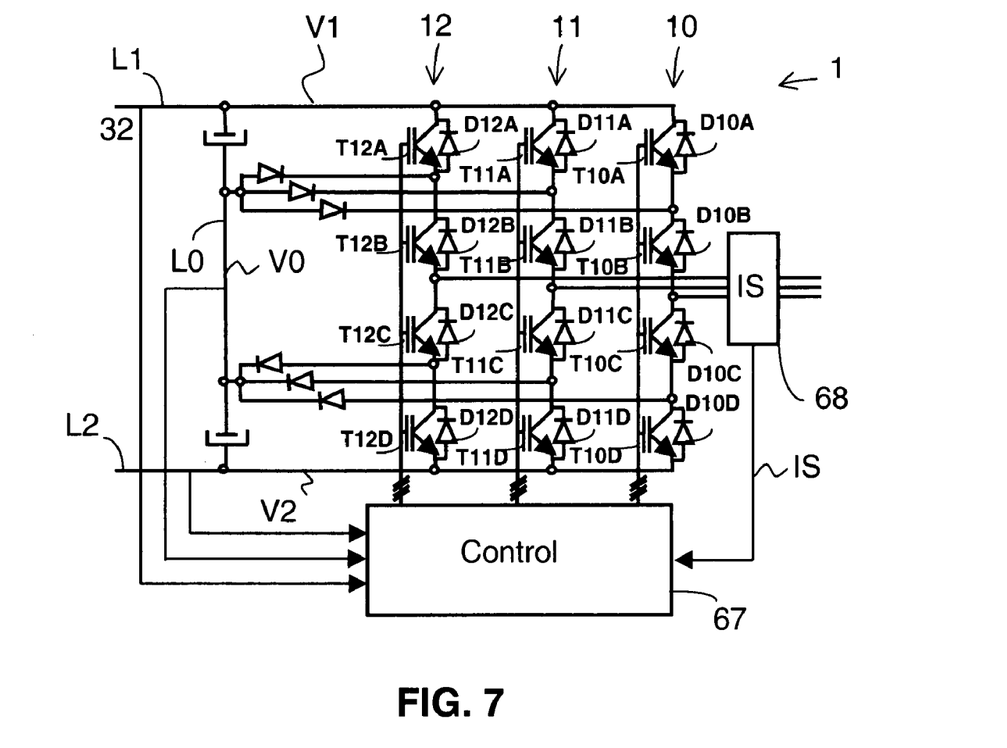
FIG. 7 represents a converter according to the invention with a control device according to FIGS. 5 and 6 to control power semi-conductor arms.

FIG. 7 represents a converter according to the invention with a control device according to FIGS. 5 and 6 to control power semi-conductor arms. The electric converter includes:

a DC power supply including a first positive voltage V1 line L1, a second negative voltage V2 line L2, and a third intermediate voltage V0 line L0, conversion means having at least three power semi-conductor arms 10, 11, 12 connected between the positive, negative or intermediate voltage lines and outputs to supply at least one output voltage, and is a control device including a control circuit controlling turn-on of the power semi-conductor arms 10, 11, 12.

Each power semi-conductor arm includes four transistors T10A to T10D, T11A to T11D and T12A to T12D coupled with diodes respectively D10A to D10D, D11A to D11D and D12A to D12D. The output voltages and currents depend on the on or off states of the transistors or of the diodes of the arms. Thus, turn-off of the outputs by over-modulation and the switching directions of the other arms are also determined according to modulation signals supplied by a regulating unit of the converter and the output currents.

A control circuit 67 includes a processing unit to supply modulation signals of control signals of the arms, and also includes modules for determining over-modulation signals. The control modulation signals MC1 coming from the converter regulating unit are used for determining the over-modulation performing turn-off of a power output of an arm. A current measuring circuit 68 arranged on output conductor lines is connected to the control device to supply signals representative of current. These signals IS are used to define the carrier signals with opposite slopes to be applied to the semi-conductor arms.

Figures 8A, 8B:
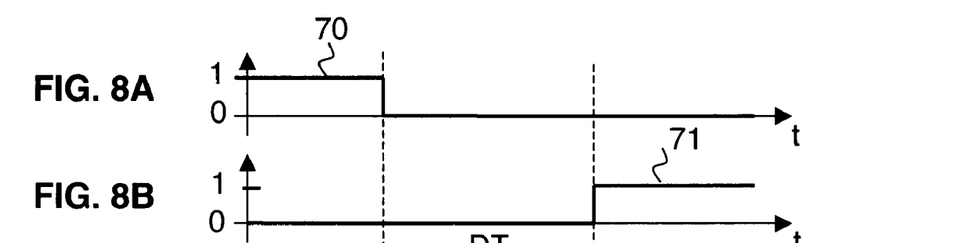
FIGS. 8A to 8C show voltage signals in power semi-conductor arms.
Figure 8C:
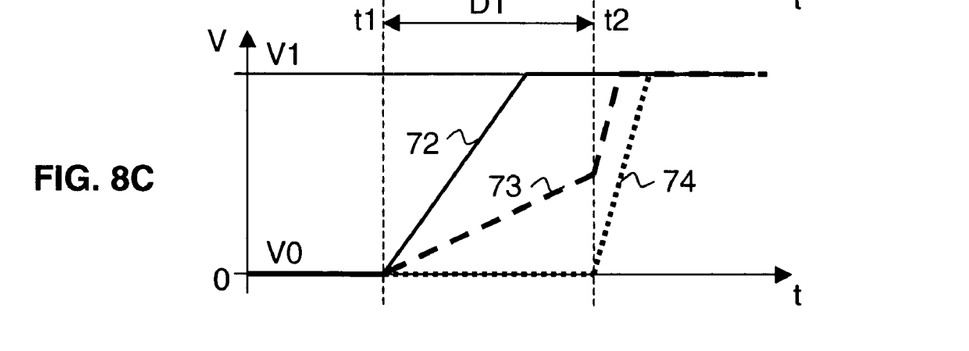

FIGS. 8A to 8C show voltage signals in power semi-conductor arms. In FIG. 8A, a curve 70 illustrates turn-off switching of a switch or transistors connected between the positive line and an output, for example T10A or T10B. In FIG. 8B a curve 71 illustrates turn-on switching of a switch or transistors connected between the negative line and an output, for example T10C or T10D. Between the times t1 and t2 corresponding to the two switchings, there is a dead time DT. In FIG. 8C, curves 72 and 74 show different voltage variation times on the output of an arm. The output voltage variation can occur on turn-off of the switch T10A or T10B, shown by curve 72 or 73, or on turn-on of the switch T10C or T10D, shown by curve 74. At this time, the variation depends on whether the switch T10A or T10B is initially diode on or transistor on, and on the sign of the current flowing therein.

In FIG. 8C, curves 72 and 73 show different voltage variations on the output when switching takes place in the transistor-diode direction. These variations are dependent on the output current value. A curve 74 shows a voltage variation on the output when switching in the diode-transistor direction takes place after the time t2. This variation depends on the transistor switching control.

Figure 9:
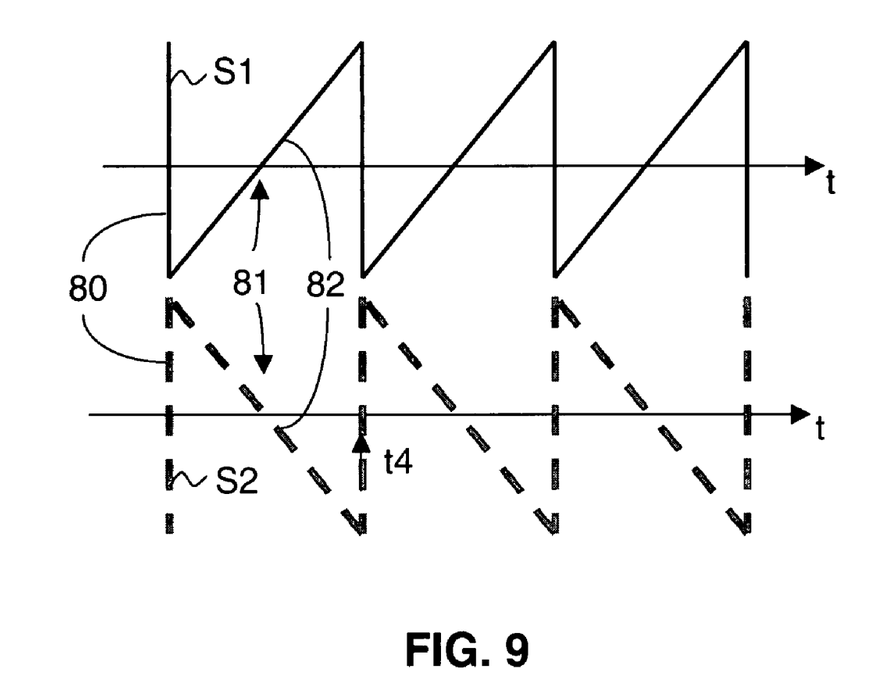
FIGS. 9 and 10 represent carrier signals with opposite slopes.

FIG. 9 represents examples of carrier signals with opposite slopes S1 and S2. In this figure, the carrier signals are signals in the shape of a saw-tooth including a first portion 80 with a very fast variation or stepped, and a second portion 81 having a slope 82 forming a ramp, the complementary double switching direction being preferably determined on the fast variation portions. For example, at the time t4 the signal S1 goes quickly from a high value to a low value whereas the signal S2 goes from a low value to a high value.

Advantageously, for better attenuation of the common mode voltage variations, the carrier signal selection module 65 selects the carrier signals according to priority switching of the same type, either transistor-diode or diode-transistor, in two arms which switch at the same time so as not to have a time lag due to the dead times. Preferably, when the choice is possible, the selection module 65 selects the carrier signals according to a priority switching in the diode-transistor direction in two arms which switch at the same time.

Figure 10:
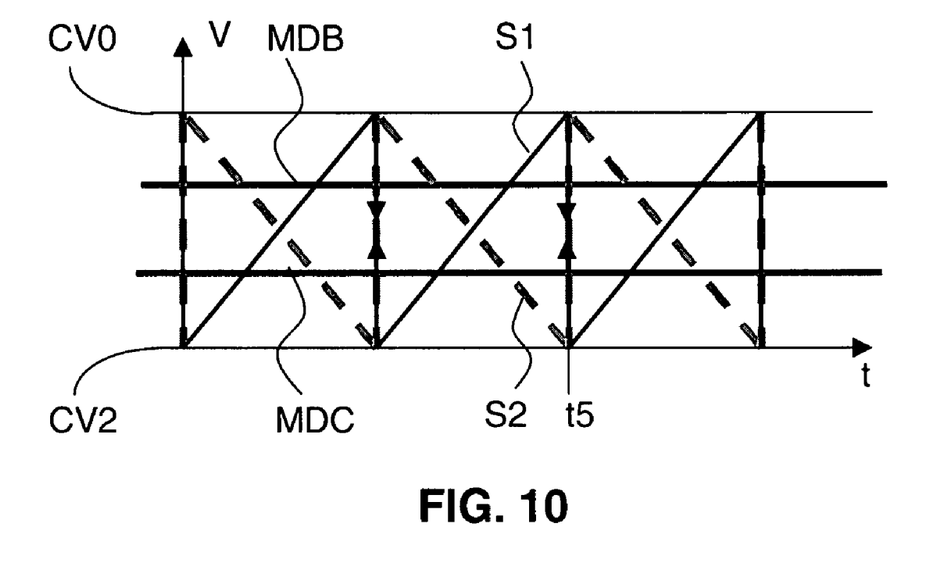

To be used with the converter arm modulation signals, the carrier signals are preferably standardized or calibrated according to the amplitude of the output voltages and of the DC supply voltages V1, V0, V2, at values respectively CV1, CV0, CV2. Thus in FIG. 10, at a time t5 the signal S1 goes quickly from a value CV0 to a value CV2 and the signal S2 goes quickly from a value CV2 to a value CV0. In FIG. 10, modulation signals MDB and MDC cross the carrier signals to command converter arms. In this figure, the modulation signal MDA is not represented for in this case it turns an arm off and does not take part in switching.

Figure 11:
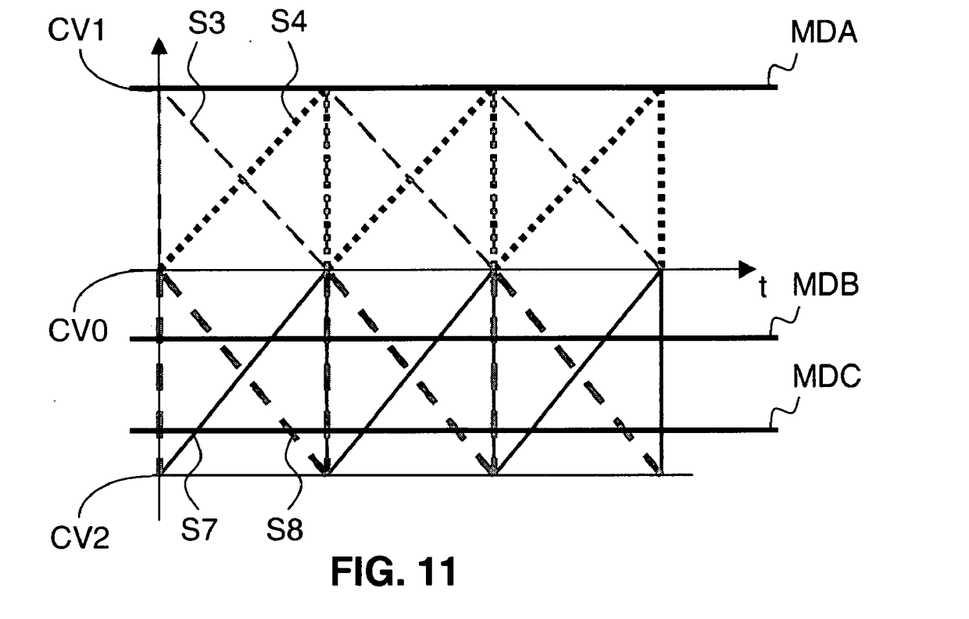
FIG. 11 represents carrier signals applicable to a control device according to the invention to control a converter with three voltage levels.

FIG. 11 represents carrier signals applicable to a control device according to the invention to control a converter with three voltage levels. In this figure, two saw-tooth carrier signal curves S3 and S4 are calibrated for power semi-conductor commands operating in globally positive voltages CV0 and CV1, and two saw-tooth carrier signal curves S7 and S8 are calibrated for power semi-conductor commands operating in globally negative voltages CV2 and CV0. The modulation signal MDA is blocked by over-modulation at the value CV1, and the carrier signals do not cross the modulation signal. On the negative part, the modulation signals MDB and MDC cross the carrier signals respectively S7 and S8. At the moment when the fast variations of the carrier signals occur, the converter output switchings are performed in complementary manner to greatly limit disturbances, in particular common mode disturbances.

Figure 12:
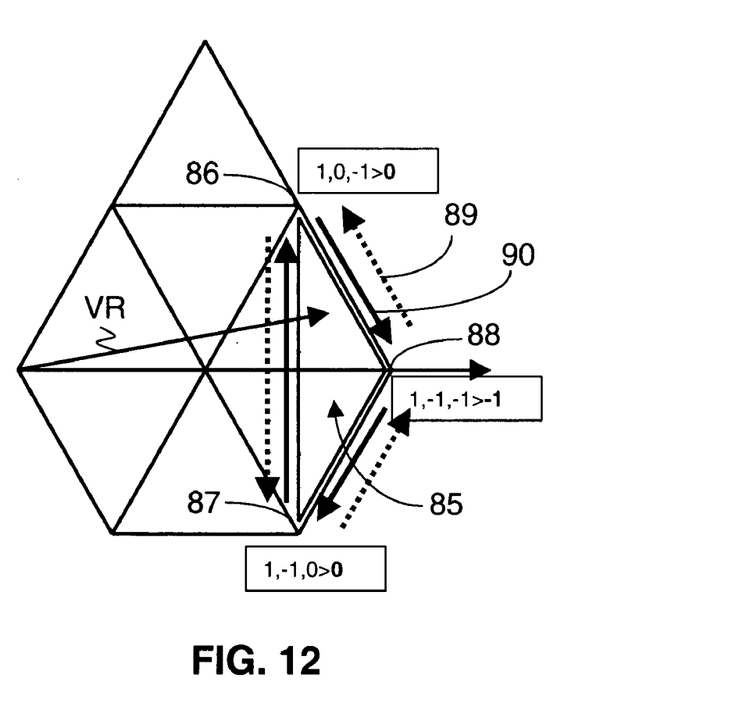
FIG. 12 represents regulation in an enlarged triangle to be used in a control device according to an embodiment of the invention.

To increase the possibilities of choice of modulation and to have additional degrees of freedom of control, in a processing device of control modulant signals according to an embodiment of the invention, modulation can preferably be performed on an enlarged modulation triangle. In FIG. 12, the carrier signal selection module selects the carrier signals according to a direction of rotation in an enlarged triangle 85 pointed by a vector VR in a control vector space. This enlarged triangle has a first apex 86 in a first initial triangle, a second apex 87 in a second initial triangle contiguous to the first triangle, and a third apex 88 common to the first triangle and to the second triangle. In this new enlarged triangle the directions of rotation illustrate the choices of carrier signals used.

The selection characteristics of the turn-on signals and of the carrier signals with opposite slopes enable an output variation with at most two voltage levels and/or an output variation with at most two voltage level variations to be obtained during a regulation cycle corresponding to a vector defined in a vector space.

Figure 13:
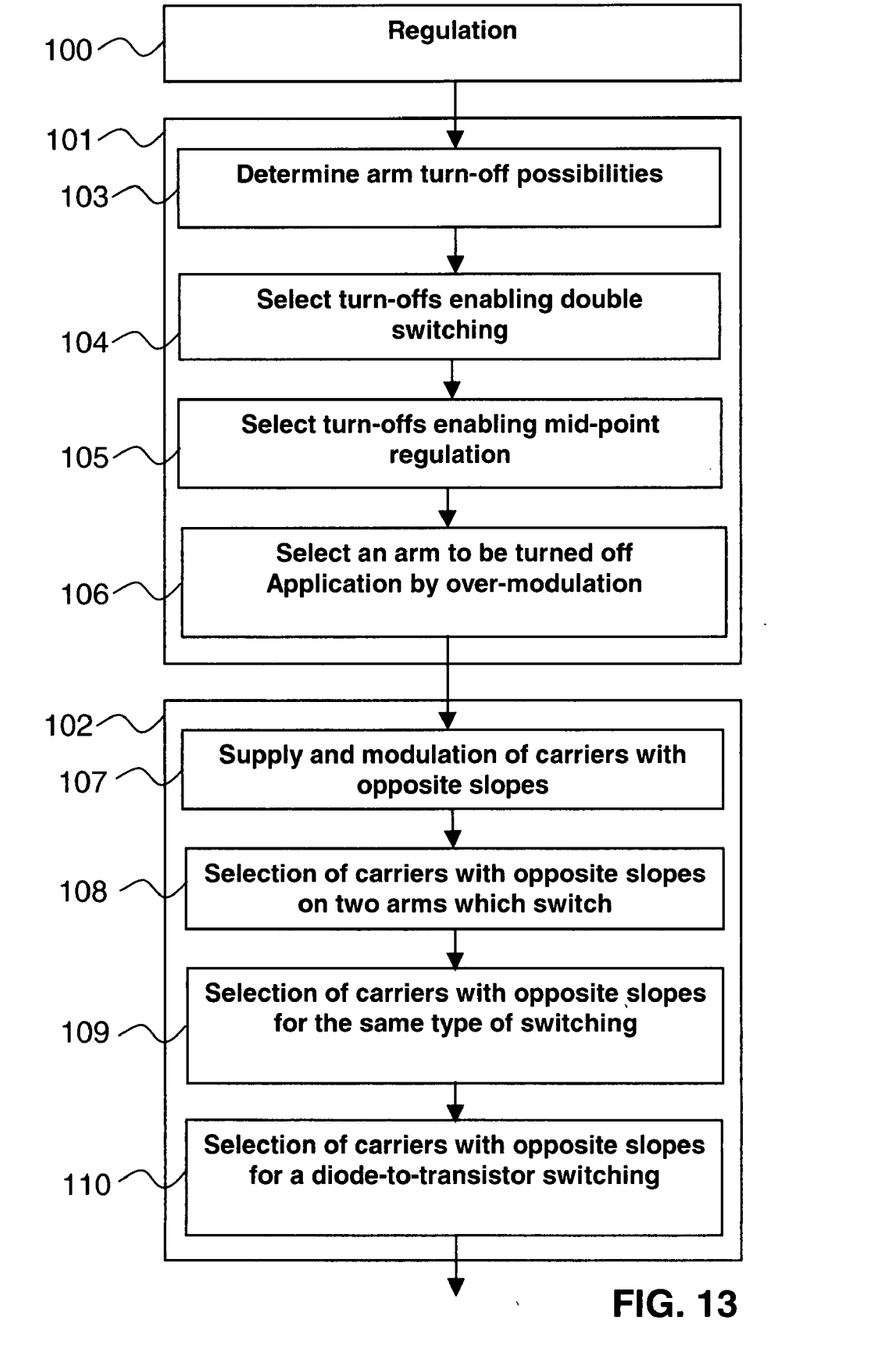
FIG. 13 represents a control method according to an embodiment of the invention.

FIG. 13 represents a flowchart of a control method according to an embodiment of the invention. During a regulation cycle, referenced by 100 at the beginning of the flowchart, two phases enable the type of turn-off and the power semi-conductor control orders to be determined. A first phase 101 determines an arm to be turned off and the turn-off position of the arm in a converter configuration with three voltage levels. Turn-off is preferably applied to modulation signals via an over-modulation signal. The over-modulation signal is advantageously carried by a general control component also carrying other regulation signals. A second regulation phase 102 selects carrier signals to obtain the control orders while at the same time optimizing the switching characteristics of the power semi-conductors of the converter arms which switch.

In the embodiment of FIG. 13, a step 103 determines the possible turn-offs enabling a converter arm to be turned off, and a step 104 makes a first selection of turn-offs enabling double switching from among the possible turn-offs. Preferably, these two steps 103 and 104 can be combined in a single step determining and directly selecting turn-offs enabling double switching from among the possible turn-offs. Selection of an over-modulation thereby enables an arm of the converter to be turned off according to the over-modulations enabling double switching.

A step 105 also makes a second selection of turn-offs suitable for intermediate voltage balancing to perform regulation. Thus, the selection selects the arm to be turned off according to the intermediate voltage balancing determined by the step 105. In a step 106, selection of the arm to be turned off is associated with an over-modulation signal.

The flowchart of FIG. 13 includes a step 107 for supplying carrier signals to supply at least two carrier signals with opposite slopes, and modulation of the carrier signals with opposite slopes by modulation signals.

A step 108 selects carrier signals with opposite slopes to be applied to control of converter arms. In a particular cycle, selection of carrier signals enables carrier signals to be selected according to a direction of rotation in an enlarged triangle pointed by a vector VR of a control vector space.

Preferably, a carrier signal selection step 109 selects carrier signals according to priority switching of the same type, either transistor-diode or diode-transistor, in two arms which switch at the same time. Advantageously, a step 110 selects the diode-transistor direction when this is possible.

In this preferred embodiment, the method includes supply of carrier signals of saw-tooth shape comprising a first portion with a very fast variation or stepped and a second portion having a slope forming a ramp, the direction of complementary double switching being determined on the fast variation portions. Thus, during a regulation cycle corresponding to a vector defined in a control vector space, a switching arm command causes an output variation having at most two voltage levels or at most two voltage level variations.

Conversion devices according to preferred embodiments are preferably variable speed drives, but they can also be in particular inverters, uninterruptible power supplies, uni-directional or two-directional power converters, or frequency converters.

The invention applies in particular to three-phase converters with three DC voltage levels with three or four arms, but other converters having a different number of arms and/or of phases can be concerned.

The functions of the control means can be performed by electronic circuits that can be analog, digital, and/or in programmed form to be implemented in microcontrollers or microprocessors.

The power semi-conductors of these converters are advantageously insulated gate bipolar transistors called IGBT but other types of semi-conductors can be used. The arms can include several semi-conductors connected in series and/or in parallel depending on the voltages, currents or electric powers used. For example, the input or output voltages can be from a few tens of volts to a thousand volts for low-voltage power system applications or have voltages of several thousand volts in particular in medium voltage applications. The input or output currents can be from a few amperes to more than a thousand amperes.

In an other technical languages, the arms of the converter can be also named legs or branches.

The invention claimed is:
1. An electric power converter and control device therefor, comprising:
 a DC power supply, comprising:
  a first line (L1) of positive voltage (V1), a second line (L2) of negative voltage (V2), and
a third line (L0) of intermediate voltage (V0) between positive voltage (V1) and negative voltage (V2),
conversion means comprising at least three power semi-conductor arms connected between said first, second, and third lines (L1, L2, L0), and outputs from the conversion means to supply at least one output voltage,
said control device further comprising:
a control means for switching voltage in the arms, which control means comprises:
   a converter regulation module for supplying control signals (MC1) for controlling voltage in the arms,
   a first means for determining possible blocking controls for blocking switching of voltage in one of the arms,
   a first blocking control selection means for selecting blocking controls from the determined possible blocking controls, wherein a selected blocking control blocks switching of voltage in a selected arm of said converter, thereby enabling double switching of the other two arms, and
   means for applying a selected blocking control to a control signal (MC1).

2. The electric converter and control device of claim 1, wherein said control means further comprises a second means for selecting blocking controls suitable for intermediate voltage balancing, wherein a selected blocking control blocks switching of voltage in a selected arm according to intermediate voltage balancing.

3. The electric converter and control device of claim 1, wherein said control means further comprises:
   means for supplying at least two carrier signals with opposite slopes, and
   means for modulating carrier signals by receiving said carrier signals with opposite slopes and modulation signals, and blocking over-modulation of an arm or output.

4. The electric converter and control device of claim 3, wherein said control means further comprises means for selecting carrier signals for application to the control signals (MC1).

5. The electric converter and control device of claim 4, wherein said means for selecting carrier signals is for selecting the carrier signals according to a direction of rotation in an enlarged triangle pointed by a vector in a control vector space.

6. The electric converter and control device of claim 4, wherein said means for selecting carrier signals is for selecting the carrier signals according to a priority switching of a same transistor-diode or diode-transistor type in two arms which switch simultaneously.

7. The electric converter and control device of claim 4, wherein the carrier signals comprise a saw-tooth shape with a first portion having a fast variation or a stepped pattern, and a second portion having a ramp-shaped slope, wherein a complementary double switching direction is determined on the portion having a fast variation.

8. The electric converter and control device of claim 1, wherein, an output of the control device has a variation comprising two voltage levels or less, during a regulation cycle corresponding to a vector defined in a vector space.

9. The electric power converter and control device of claim 1, wherein the control means further comprises:
   current measuring means arranged on output conductor lines and connected to said control means for supplying signals representative of currents (Is) to the first means for determining possible blocking controls.

10. A method for controlling an electric power converter, the converter comprising: a DC power supply with a first line (L1) of positive voltage (V1), a second line (L2) of negative voltage (V2), and a third line (L0) of intermediate voltage (V0), and a conversion means having at least three power semi-conductor arms connected between said lines (L1, L2, L0) of positive, negative and intermediate voltage, and outputs to supply at least one output voltage, the method comprising:
   switching voltage in the arms by:
      a step for determining possible blocking controls for blocking switching of voltage in one of the arms,
      a step for selecting blocking controls from the determined possible blocking controls for enabling double switching of the other two arms, and
      a step for applying a selected blocking control to a control signal (MC1).

11. The method of claim 10, further comprising a step for selecting blocking controls suitable for intermediate voltage balancing, by selecting an arm in which to block switching of voltage according to intermediate voltage balancing.

12. The method of claim 10, further comprising:
   a step for supply supplying at least two carrier signals with opposite slopes, and
   a step for modulating said carrier signals with opposite slopes by overmodulating a power arm or output blocking control.

13. The method of claim 10, further comprising a step for selecting carrier signals for application to control signals (MC1).

14. The method of claim 10, further comprising a step for selecting carrier signals according to a direction of rotation in an enlarged triangle pointed by a vector of a control vector space.

15. The method of claim 10, further comprising a step for selecting carrier signals according to a priority simultaneous switching of a same transistor-diode or diode-transistor type in two arms.

16. The method of claim 10, further comprising a step for supplying a carrier signal having a saw-tooth shape, with a first portion having a fast variation or a stepped pattern and a second portion having a ramp-shaped slope, wherein a complementary double switching direction is determined on the portion having a fast variation.

17. The method of claim 10, further comprising a step for causing an output variation having at most two voltage levels or at most two voltage level variations, during a regulation cycle corresponding to a vector defined in a vector space.

* * * * *